US 009187269B2

(12) United States Patent  
Womack

(10) Patent No.: US 9,187,269 B2
(45) Date of Patent: Nov. 17, 2015

(54) POLYMERIC PIPE LOADING

(71) Applicant: Chevron Phillips Chemical Company LP, The Woodlands, TX (US)

(72) Inventor: Andrew G. Womack, Plano, TX (US)

(73) Assignee: CHEVRON PHILLIPS CHEMICAL COMPANY LP, The Woodlands, TX (US)

(*) Notice: Subject to any disclaimer, the term of this patent is extended or adjusted under 35 U.S.C. 154(b) by 527 days.

(21) Appl. No.: 13/650,881

(22) Filed: Oct. 12, 2012

(65) Prior Publication Data

US 2014/0103565 A1   Apr. 17, 2014

(51) Int. Cl.
  B65G 67/12   (2006.01)
  B29C 47/00   (2006.01)
  B65G 57/04   (2006.01)
  B65G 57/06   (2006.01)
  B65G 65/00   (2006.01)

(52) U.S. Cl.
  CPC ............... B65G 57/04 (2013.01); B65G 57/06 (2013.01); B65G 65/00 (2013.01); B29C 47/0023 (2013.01); B29C 47/0066 (2013.01); B65G 2201/0276 (2013.01)

(58) Field of Classification Search
  CPC ...... B65G 57/04; B65G 57/06; B65G 65/005; B65G 65/02; B65G 2201/0276; B29C 47/0023; B29C 47/0066
  USPC .................. 264/150; 414/745.7, 745.9, 746.7, 414/746.8, 589
  See application file for complete search history.

(56) References Cited

U.S. PATENT DOCUMENTS

| 3,780,884 | A | * | 12/1973 | Jones | .................... | B65G 57/035 405/223.1 |
| 3,849,052 | A | * | 11/1974 | Gordon | .................... | B29C 57/08 425/387.1 |
| 3,886,832 | A | * | 6/1975 | Harris | ...................... | B26D 1/60 83/308 |
| 3,969,173 | A | * | 7/1976 | Amberg | .................. | B29C 69/00 156/183 |
| 4,684,314 | A |   | 8/1987 | Luth |  |  |
| 5,636,965 | A | * | 6/1997 | Newnes | ............... | B65G 47/918 198/468.4 |

(Continued)

FOREIGN PATENT DOCUMENTS

DE  238929      9/1986
DE  238929  A  * 9/1986

(Continued)

OTHER PUBLICATIONS

DD238929A1 GER to ENG machine translastion.*

(Continued)

*Primary Examiner* — Alison Hindenlang
*Assistant Examiner* — Lawrence D Hohenbrink, Jr.
(74) *Attorney, Agent, or Firm* — Conley Rose, P.C.; Rodney B. Carroll; Cheryl L. Huseman

(57) ABSTRACT

Polymeric pipe loaders and polymeric pipe loading methods are disclosed. A polymeric pipe loader may include a support frame, a positioning platform coupled to the support frame, and a vacuum lift mechanism coupled to the support frame, the positioning platform, or both. A polymeric pipe loading method may include extruding a length of polymeric pipe, cutting the length of polymeric pipe, receiving the length of polymeric pipe on a conveyor chain of a positioning platform, engaging the length of polymeric pipe with a vacuum lift mechanism, and transferring the length of polymeric pipe to a bundling cart.

20 Claims, 8 Drawing Sheets

(56) References Cited

U.S. PATENT DOCUMENTS

| | | | |
|---|---|---|---|
| 6,085,852 A | 7/2000 | Sparks et al. | |
| 6,341,698 B1 | 1/2002 | Wursthorn | |
| 7,665,944 B2 | 2/2010 | Guidroz | |
| 7,832,974 B2 | 11/2010 | Fikowski et al. | |
| 8,113,762 B2 | 2/2012 | Belik | |
| 2006/0182614 A1* | 8/2006 | Roesch | B65B 17/02 414/793 |
| 2013/0032960 A1* | 2/2013 | Russo | B29C 47/0033 264/40.5 |

FOREIGN PATENT DOCUMENTS

| | | |
|---|---|---|
| DE | 238929 A1 | 9/1986 |
| DE | 9202553 | 4/1992 |
| DE | 9202553 U1 | 4/1992 |
| FR | 2843366 A1 | 2/2004 |
| JP | S62216721 | 9/1987 |
| JP | S62216721 A | 9/1987 |

OTHER PUBLICATIONS

DD238929A1 GER to ENG machine translation.*

Foreign communication from a related counterpart application—International Search Report, PCT/US2013/063987, Jan. 13, 2014, 4 pages.

International Search Report for PCT/US2013/063987 dated Jan. 13, 2014.

* cited by examiner

POLYMERIC PIPE LOADING

FIELD OF THE INVENTION

The present disclosure relates to loading of polymeric pipe.

BACKGROUND OF THE INVENTION

Large diameter polymeric pipe can be manufactured in lengths which can weigh over ten thousand pounds. These heavy pipe lengths can be packaged into bundles for shipping. In order to package heavy lengths of pipe into bundles, a mechanism is needed to transfer the heavy lengths of pipe to a bundling cart. One such mechanism involves hoisting the heavy length of pipe with straps and using a crane to transfer the hoisted heavy lengths of pipe to the bundling cart. During transfer, the heavy lengths of pipe can swing and bend, creating both personnel-safety issues and damage to the heavy lengths of pipe.

SUMMARY OF THE INVENTION

Disclosed herein is a polymeric pipe loader comprising a support frame, a positioning platform coupled to the support frame, and a vacuum lift mechanism coupled to the support frame, the positioning platform, or both. The positioning platform comprises a pair of parallel channels coupled to the support frame, a conveyor chain configured to move from a first position to a second position along the pair of parallel channels, a sprocket configured to move the conveyor chain along the pair of channels, and a rotating mechanism configured to rotate the sprocket.

Also disclosed herein is a polymeric pipe loading method comprising: extruding a length of polymeric pipe, cutting the length of polymeric pipe, receiving the length of polymeric pipe on a conveyor chain of a positioning platform, engaging the length of polymeric pipe with a vacuum lift mechanism, and transferring the length of polymeric pipe to a bundling cart.

Also disclosed herein is a polymeric pipe loading method comprising: extruding a length of polymeric pipe, cutting the length of polymeric pipe, moving a conveyor chain along a pair of parallel channels of a positioning platform to a second position above a vacuum lift mechanism, and receiving the length of polymeric pipe on the conveyor chain in the second position.

DETAILED DESCRIPTION OF THE EMBODIMENTS

Figure 1:
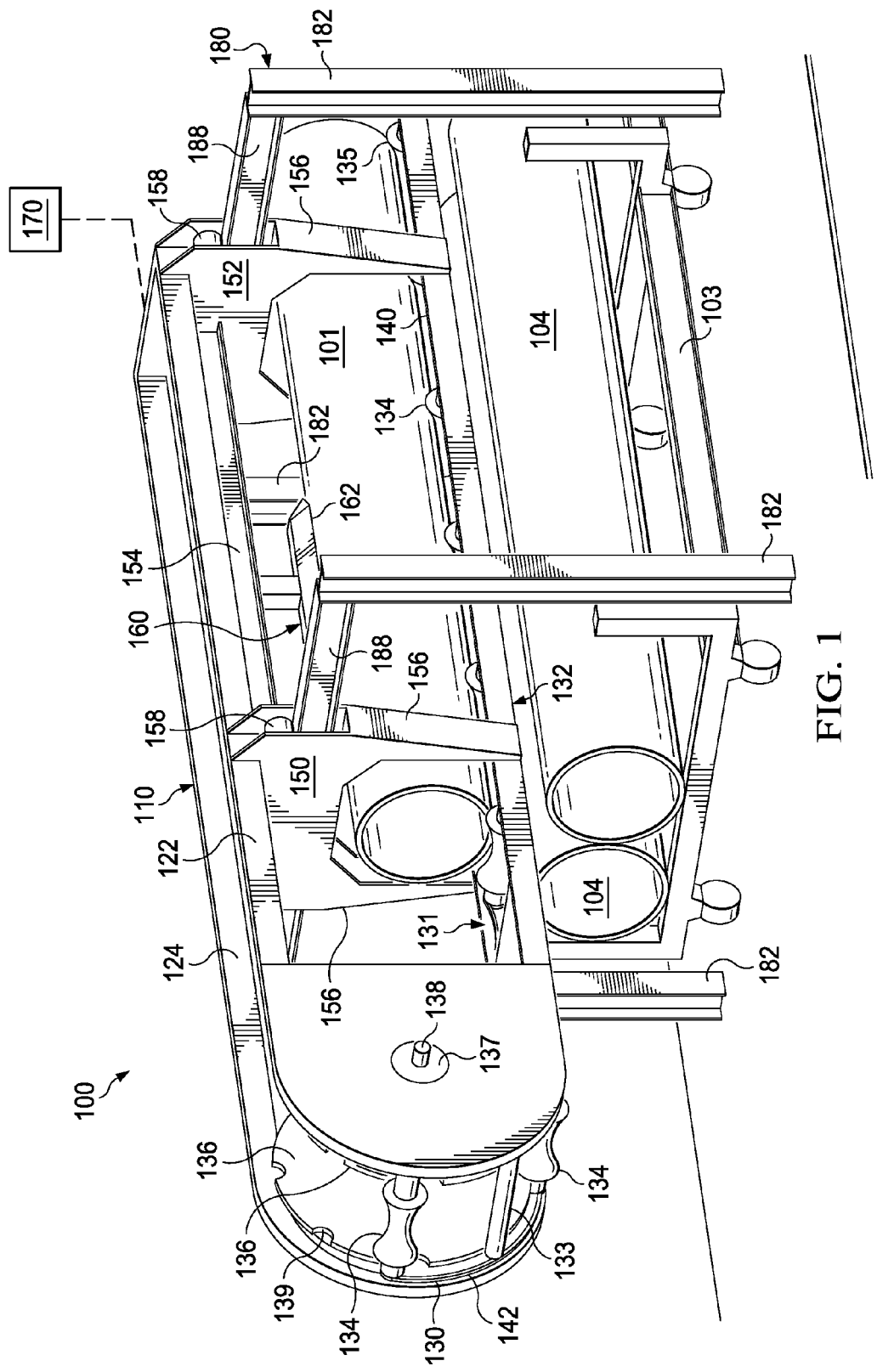
FIG. 1 shows a perspective view of an embodiment of the disclosed polymeric pipe loader.

In the drawings and description that follow, like parts are typically marked throughout the specification and drawings with the same reference numerals, respectively. The drawing figures are not necessarily to scale. Certain features may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification of principles, and is not intended to limit the claims to the embodiments illustrated and described herein. It is to be fully recognized that the different teachings of the embodiments discussed infra may be employed separately or in any suitable combination to produce desired results. In the drawings and description that follow, like parts are typically marked throughout the specification and drawings with the same reference numerals, respectively. The drawing figures are not necessarily to scale. Certain features may be shown exaggerated in scale or in somewhat schematic form and some details of conventional elements may not be shown in the interest of clarity and conciseness. Specific embodiments are described in detail and are shown in the drawings, with the understanding that the present disclosure is to be considered an exemplification of principles, and is not intended to limit the claims to the embodiments illustrated and described herein. It is to be fully recognized that the different teachings of the embodiments discussed infra may be employed separately or in any suitable combination to produce desired results.

Disclosed herein is a polymeric pipe loader which may be used in a polymeric pipe loading system to perform polymeric pipe loading methods. The polymeric pipe loader may load lengths (e.g., 10 ft, 20 ft, 30 ft, 40 ft, 50 ft, or greater) of polymeric pipe onto a conventional bundling cart from a conventional pipe extrusion line. The disclosed system and methods may load large diameters of polymeric pipe. For example, the polymeric pipe loaded according to the disclosure may have a diameter from about 8 inches to about 36 inches. The polymeric pipe may comprise any polymer suitable for use as pipe, for example, high-density polyethylene.

Referring to FIG. 1, an embodiment of a polymeric pipe loader 100 is shown. The polymeric pipe loader 100 may comprise a support frame 180, a positioning platform 110, and a vacuum lift mechanism 160. The polymeric pipe loader 100 may further comprise a controller 170 to control a movement of the support frame 180, the positioning platform 110, the vacuum lift mechanism 160, or combinations thereof. The positioning platform 110 may be coupled to the support frame 180, and the vacuum lift mechanism 160 may be coupled to the support frame 180, the positioning platform 110, or both.

The positioning platform 110 may comprise a pair of parallel channels 122 and 124 coupled to the support frame 180, a conveyor chain 130 configured to move from a first position to a second position along the pair of parallel channels 122 and 124, one or more sprockets 136 configured to move the conveyor chain 130 along the pair of channels 122 and 124, and a rotating mechanism 137 configured to rotate the sprockets 136.

The parallel channels 122 and 124 provide a path for a movement of the conveyor chain 130. In the embodiment of FIG. 1, each of the pair of channels 122 and 124 forms a U-shaped path for movement of the conveyor chain 130; however, it should be understood any path of the channels 122 and 124 is contemplated in which the channels 122 and 124 are parallel and facilitate a movement of the conveyor chain 130. The channels 122 and 124 may each have a U-shaped cross section which facilitates containment of the conveyor chain 130 within the channels 122 and 124. The channels 122 and 124 may be made of a metal or high density polymeric material.

Figure 4:
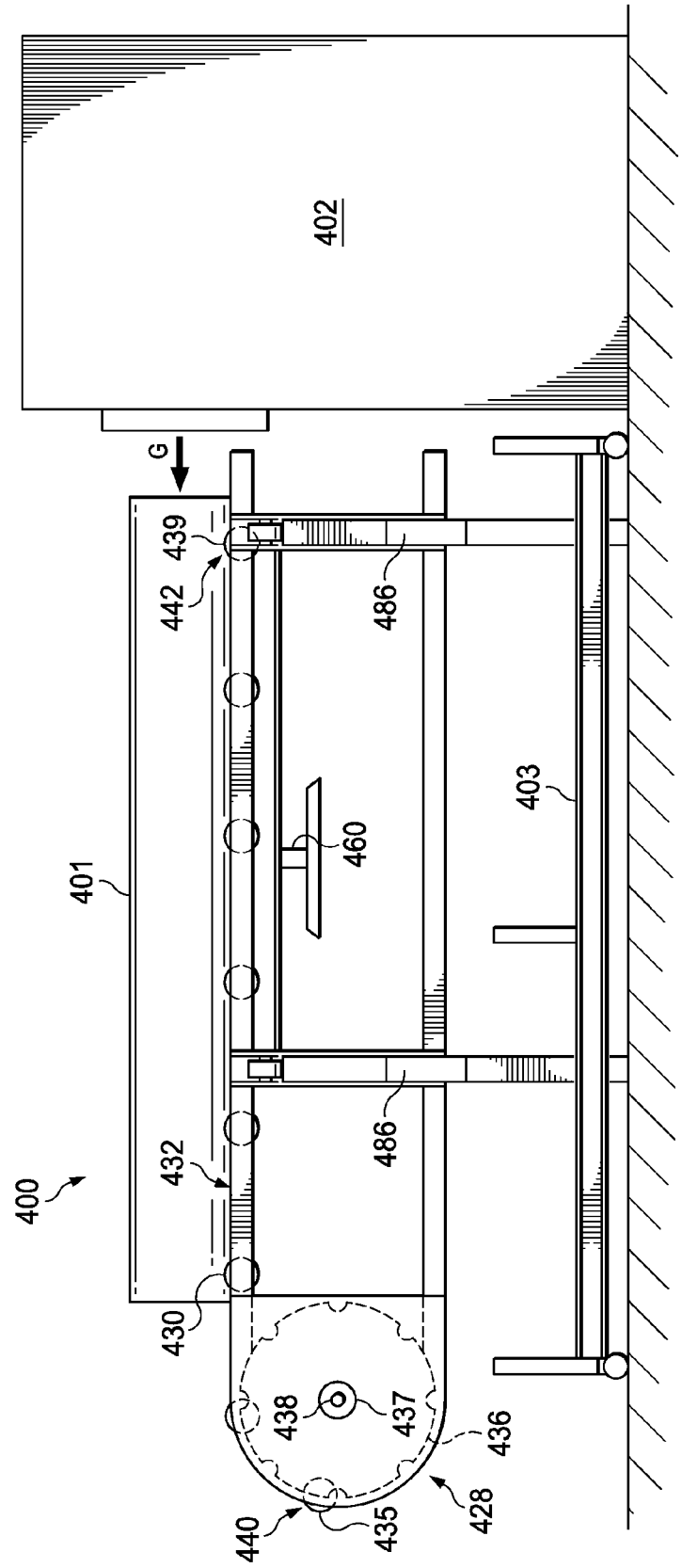
FIG. 4 shows a side view of a polymeric pipe loading system utilizing an alternative embodiment of the disclosed method.

The conveyor chain 130 may comprise a roller chain as will be understood to those skilled in the art with the aid this disclosure. For example, the conveyor chain 130 may comprise a first set of links which are parallel to a second set of links. The first and second sets of links may be connected by pins 133 extending between the first and second sets of links. The conveyor chain 130 may have sleeves and bushings associated with the pins 133 and links as will be understood to those skilled in the art with the aid this disclosure. The conveyor chain 130 is shown as in the first position in FIG. 1, and may receive a polymeric pipe 101 while in the first position. As described in embodiments below, the conveyor chain 130 may move from the first position to one or more other positions (e.g., the second position), and the polymeric pipe loader 100 may receive a polymeric pipe 101 while the conveyor chain 130 is in the second position (for example, as shown in FIG. 4 and described in more detail herein).

In an embodiment, the conveyor chain 130 may comprise rollers 134 configured to receive a length of polymeric pipe 101 thereon. The rollers 134 may extend over the pins 133 between the two sets of links of the conveyor chain 130, for example, and the rollers 134 may roll about the pins 133 as a length of polymeric pipe 101 is rolled onto the conveyor chain 130 of the polymeric pipe loader 100. The rollers 134 may comprise at least one ratcheted roller 135 adjacent an end 140 of the conveyor chain 130. In embodiments, one or more ratcheted rollers may be placed on end 140 of the conveyor chain 130, on opposite end 142 of the conveyor chain 130, or both. Such placement of ratcheted rollers (e.g., on both ends 140 and 142 of conveyor chain 130) may enable indexing of the conveyor chain 130 in both the first position (described in FIG. 3A below) and the second position (described in FIG. 4 below). The ratcheted roller 135 may be configured to rotate in only one direction. The rollers 134 are configured to receive the length of polymeric pipe 101 on a top 131 of the conveyor chain 130 when the conveyor chain 130 is in the first position. The rollers 134 may be alternatively or additionally configured to receive the length of polymeric pipe 101 on a bottom 132 of the conveyor chain 130 when the conveyor chain 130 is in the second position. For example, the rollers 134 may be concave allowing the length of polymeric pipe 101 to seat and be supported thereon when the conveyor chain 101 is in the first and/or second position.

The sprockets 136 may be of any type suitable for use with the conveyor chain 130 disclosed herein. The sprockets 136 may generally have a circular shape with spaced teeth 139, and the sprockets 136 may engage at least a portion of the conveyor chain 130. For example, sprockets 136 may have teeth 139 which are spaced to engage the pins 133 extending between the links of the conveyor chain 130. The sprockets 136 may be in spaced parallel relationship, and one of sprockets 136 may engage the first set of links and associated ends of a given plurality of pins 133 of the conveyor chain 130 while another of the sprockets 136 may engage the second set of links and associated ends of a given plurality of pins 133 of the conveyor chain 130. The conveyor chain 130 may engage with the sprockets 136 as the conveyor chain 130 moves from the first position to the second position and vice versa. The sprockets 136 may be made of any suitable material such as metal or high density plastic.

The rotating mechanism 137 may rotate the sprockets 136 about axle 138. The rotating mechanism 137 may be any suitable mechanism for providing, directly or indirectly, the torque necessary to rotate the sprockets 136 and move the conveyor chain 130 from the first position to the second position (and vice versa), where the conveyor chain 130 may have at least a portion of the weight of the polymeric pipe 101 bearing thereon. In an embodiment, the rotating mechanism 137 may comprise an electric motor. In embodiments, the rotating mechanism 137 may be controlled by controller 170. It should be understood that the rotating mechanism 137 in some embodiments may not itself rotate in order to rotate one or more of the sprockets 136. In alternative embodiments, the positioning platform 110 may comprise more than one rotating mechanism 137. For example, the positioning platform 110 may comprise two rotating mechanisms (e.g., one for each sprocket 136), which rotate the sprockets 136 synchronously, with or without an axle 138 connecting the sprockets 136. Rotating mechanism 137 may comprise gears, transmission, and/or clutch for selectively engaging, disengaging, speed control, weight adjustment, etc.

The positioning platform 110 may further comprise one or more coupling members 150 and 152 configured to couple the pair of parallel channels 122 and 124 to the support frame 180. For example, the coupling members 150 and 152 may attach to the pair of parallel channels 122 and 124 by welding, adhesion, integral formation, bracketing, clamping, bolting, the like, or combinations thereof. As described in more detail below, the coupling members 150 and 152 may be further configured to move the positioning platform 110 horizontally about the support frame 180. For example, the coupling members 150 and 152 may comprise a servo-motor and wheel assembly 158 which may be controlled by controller 170 to move the positioning platform 110 horizontally along a crossbar 188 of the support frame 180. Additionally or alternatively, the coupling members 150 and 152 may comprise a linear actuator, a hydraulic cylinder, a rack-and-pinion assembly, or combinations thereof.

The positioning platform 180 may further comprise one or more pipe-guide members 156 coupled to at least one of the pair of parallel channels 122 and 124. In FIG. 1, pipe-guide members 156 are connected to both channels 122 and 124, and the pipe-guide members 156 are integrally formed with the coupling members 150 and 152. In an alternative embodiment, pipe-guide members 156 may be separately formed from coupling members 150 and 152, in which case, the pipe-guide members 156 may be attached to the coupling members 150 and 152 by means known in the art, e.g., welding, adhesion, brackets, bolts, etc. A length of polymeric pipe 101 can be seen extending between the pipe-guide members 156. The pipe-guide members 156 guide the length of polymeric pipe 101 as the pipe 101 moves onto the conveyor chain 130. For example, the pipe-guide members 156 may prevent the polymeric pipe 101 from rolling off of the conveyor chain 130.

The support frame 180 may support the positioning platform 110 and facilitate a horizontal and a vertical movement of the positioning platform 110. The support frame 180 may comprise legs 182 interconnected by crossbars 188. The legs 182 may be substantially vertical, and the crossbars 188 may be substantially horizontal, e.g., the legs 182 may be connected to the crossbars 188 at an about 90 degree angle. As discussed above, the coupling members 150 and 152 may be further configured to move the positioning platform 110 horizontally about the support frame 180. As can be seen in FIG. 1, the crossbars 188 of the support frame 180 extend through the coupling members 150 and 152.

The vacuum lift mechanism 160 may be positioned between the channels 122 and 124. In FIG. 1, the vacuum lift mechanism 160 is shown as coupled to the channels 122 and 124 of the positioning platform 110; however, it should be understood vacuum lift mechanism 160 may be additionally or alternatively coupled to the support frame 180, for example to the crossbars 188 or other crossbars not shown in FIG. 1.

The vacuum lift mechanism 160 may comprise any suitable vacuum lifter for the sizes of polymeric pipe described herein. In an embodiment, the vacuum lift mechanism 160 may comprise a suction source (e.g., a vacuum pump) coupled with an engaging surface 162 (e.g., a suction pad or other surface known in the art). The vacuum lift mechanism 160 may engage the polymeric pipe 101 via a vacuum force. The vacuum lift mechanism 160 may be vertically movable as described in more detail herein to lift polymeric pipe 101 from the conveyor chain 130 and lower the polymeric pipe 101 into the bundling cart 103 while engaged with the polymeric pipe 101 via a vacuum force. The vacuum, the movement, or both of the vacuum lift mechanism 160 may be controlled by controller 170.

The controller 170 may comprise any suitable control device for controlling the movement of the components of the polymeric pipe loader 100, e.g., the positioning platform 110, the support frame 180, the vacuum lift mechanism 160, or combinations thereof. In embodiments, the controller 170 may be associated with a computer and/or computer program, and may automate the movements of the polymeric pipe loader 100. In alternative or additional embodiments, the controller 170 may be associated with a user interface (e.g., a keypad or graphic user interface) to manually control the movements of the polymeric pipe loader 100. In embodiments, the controller 170 may comprise a programmable logic controller (PLC). Regardless whether a user manually controls the controller 170, whether the controller 170 is automated, or both, the disclosed embodiments may operate without the need for human interaction with the length of polymeric pipe 101 while the polymeric pipe loader 100 loads said pipe 101. The controller 170 may control the various components of the polymeric pipe loader 100 through wired or wireless communication as will be understood to those skilled in the art with the aid this disclosure.

The polymeric pipe loader 100 may be used to load polymeric pipe 101 onto a bundling cart 103. The bundling cart 103 may be of the type as will be understood to those skilled in the art with the aid this disclosure, and generally may include a frame supported on wheels. The polymeric pipe loader 100 is configured so the bundling cart 103 may be positioned under the positioning platform 110, to the side of the positioning platform 110, adjacent an end of the positioning platform 110, or combinations thereof, and polymeric pipe 101 may be lowered into position on the bundling cart 103. The bundling cart 103 may hold multiple pipes, and in FIG. 1, polymeric pipes 104 were previously loaded onto the bundling cart 103 by the polymeric pipe loader 100. The bundling cart 103 may use wheels to roll to and from (and underneath) the polymeric pipe loader 100. Once a bundling cart is full of lengths of polymeric pipe, the pipe are secured into the bundling cart and secured, for example, by straps. In embodiments, lengths of polymeric pipe may be loaded into the bundling carts in multiple stacked levels. In such embodiments, spacers (e.g., wood spacers of 2" by 4") may be placed between the levels of stacked polymeric pipe. After the bundling cart 103 is loaded with polymeric pipe, the bundling cart 103 may be moved to an area for shipping to a distributor, a supplier, a retailer, a resaler, an end-user, etc.

Figure 2:
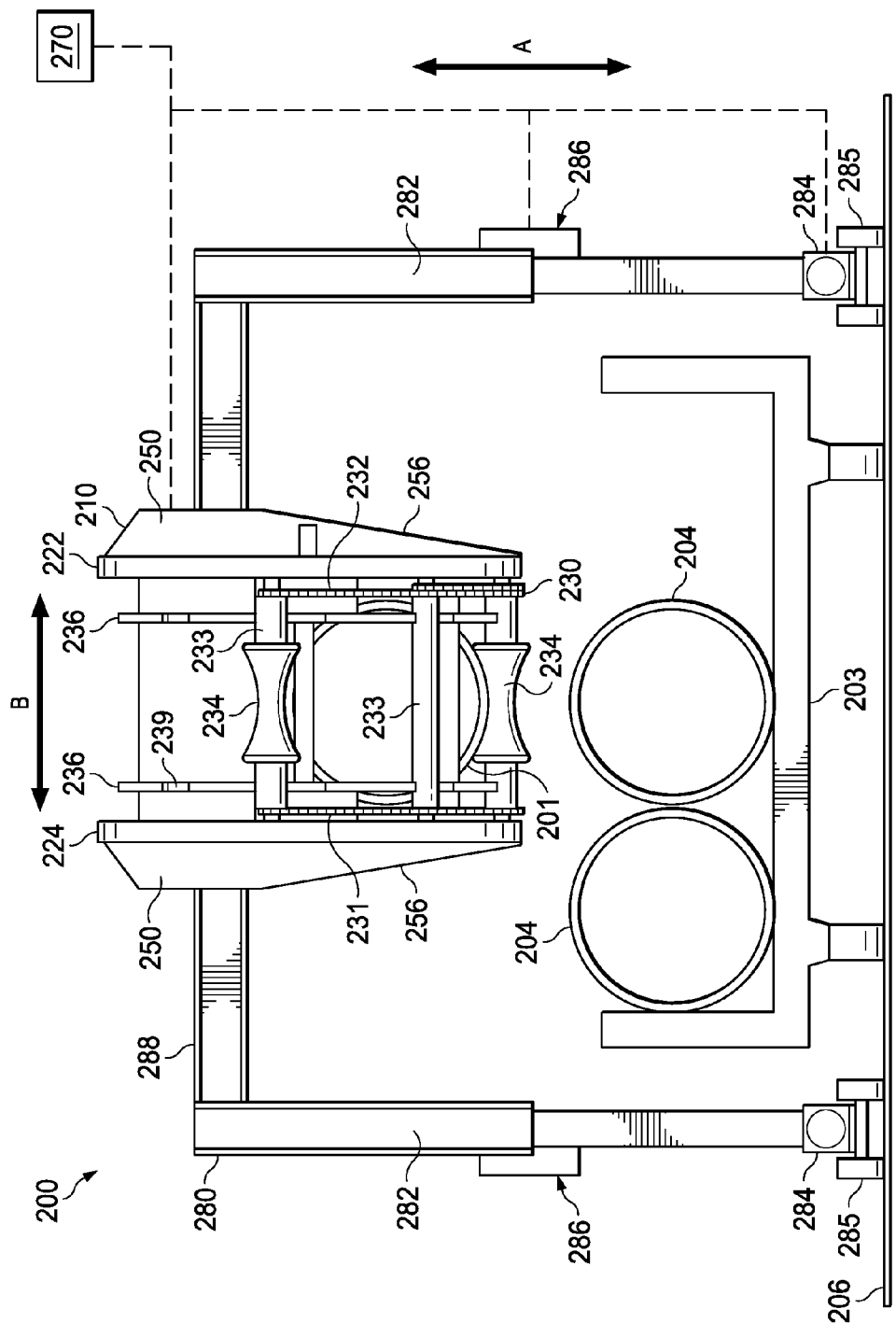
FIG. 2 shows an end view of another embodiment of the disclosed polymeric pipe loader.

Referring to FIG. 2, an end view of another embodiment of the polymeric pipe loader 200 is shown. The polymeric pipe loader 200 of FIG. 2 may comprise a positioning platform 210 coupled to a support frame 280. In embodiments, the support frame 280 may be configured to adjust a vertical height of the positioning platform 210. Vertical movement of the support frame 280 (and consequently, the positioning platform 210) may be characterized by the directions shown by double-ended arrow A. In embodiments, the positioning platform 210 is configured to move horizontally about the support frame 280. For example, horizontal movement of the positioning platform 210 may be characterized by the directions shown by double-ended arrow B. The legs 282 of the support frame 280 may have a vertical height mechanism 286 coupled thereto for adjusting a vertical height of the support frame 280. In an embodiment, the legs 282 may be configured to adjust a vertical height of the support frame 280 by extending, retracting, or both. For example, the legs 282 may have telescoping portions (e.g., concentric hydraulic pistons) which telescopically extend to increase a height of the support frame 280 and which telescopically retract to decrease a height of the support frame 280. The vertical height mechanism 286 may be configured to adjust an extension or retraction of telescoping legs 282. In an additional or alternative embodiment, the legs 282 may have portions which move with respect to one another via gears, tracks, ratchets, screws, scissors, etc., for example, and the vertical height mechanism 286 may be configured to move the portions of the legs 282. In additional or alternative embodiments, the legs 282 may have portions which extend or retract from one another by a continuous screw assembly or a piston assembly, and the vertical height mechanism 286 may be configured to move the portions of the legs 282 which may be extended and retracted by a continuous screw assembly or a piston assembly. The vertical height mechanism 286 may be operably coupled to controller 270 for automatically or manually controlled movement of the vertical height of the support frame 280. Similar mechanisms for adjusting vertical height may be additionally or alternatively employed to adjust the vertical height of the vacuum lift mechanism.

The polymeric pipe loader 200 may move about the floor 206 via wheels 285 coupled to the legs 282 of the support frame 280. Servo motors 284 may rotate the wheels, and the polymeric pipe loader 200 may be moved by controller 270 operably coupled to the servo motors 284. The wheels 285 may be pivotable to move the polymeric pipe loader 200 in any lateral direction about floor 206. For example, the polymeric pipe loader 200 may move in any direction about floor 206 to load a length of polymeric pipe 201 (which has been received on the conveyor chain 230) onto the bundling cart 203.

As seen in FIG. 2, the conveyor chain 230 may engage with the sprockets 236. Pins 233 of the conveyor chain 230 may engage with the teeth 239 of the sprockets 236. Rollers 234 of the conveyor chain 230 may have a contour to receive the polymeric pipe 201. The pair of parallel channels 222 and 224 may retain the conveyor chain 230. The crossbar 288 of the support frame 280 may extend through the coupling member 250 having pipe guide members 256. The positioning platform 210 may be positioned above loaded pipes 204 on the bundling cart 203.

Figure 3A:
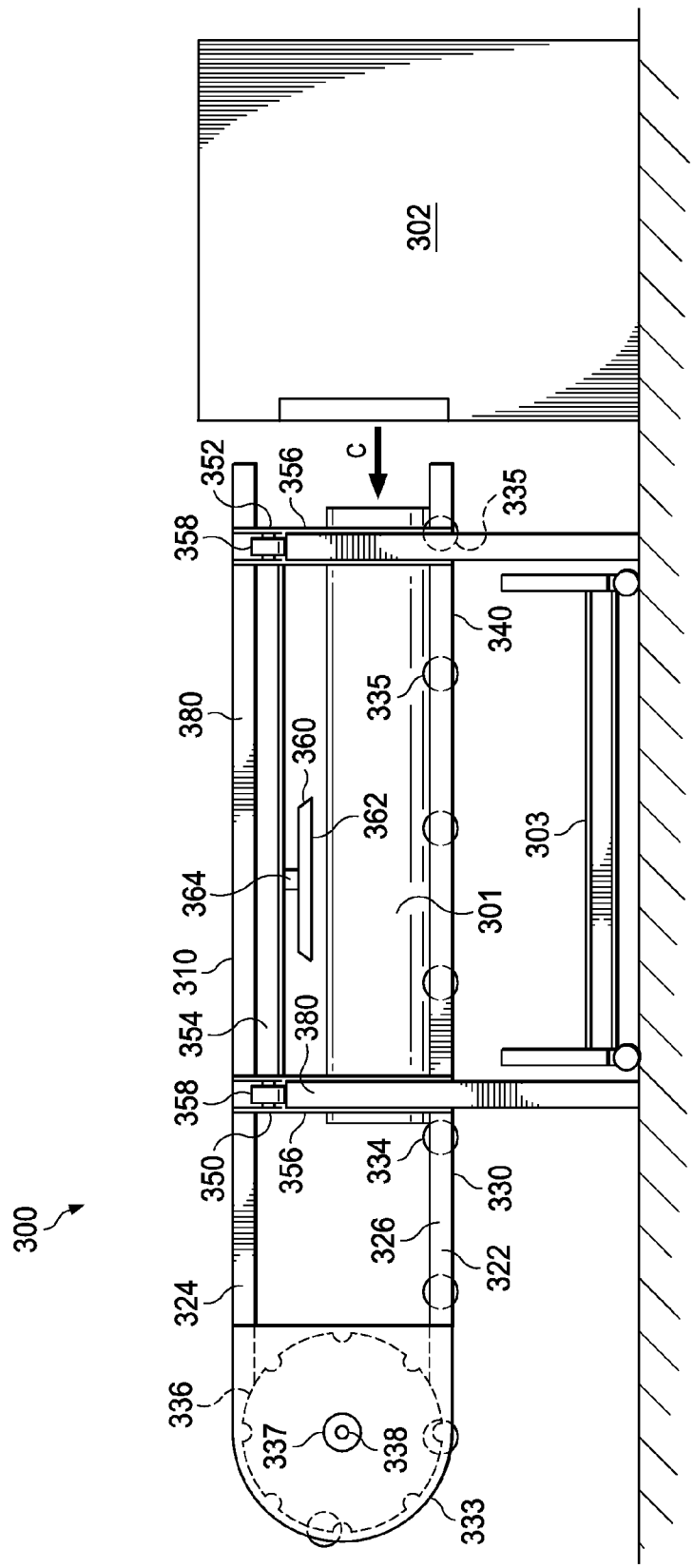
FIGS. 3A-3D show side views of a polymeric pipe loading system utilizing an embodiment of the disclosed method.

FIGS. 3A-3D show side views of an embodiment of a polymeric pipe loading system utilizing an embodiment of the disclosed method. The disclosed system may comprise a polymeric pipe extrusion line 302, a polymeric pipe loader 300, and a bundling cart 303. The extrusion line 302 may comprise any polymer extrusion line suitable for extruding long lengths of large-diameter pipe which would be understood by those skilled in the art with the aid of this disclosure. For example, the extrusion line 302 may comprise an extruder, a die, sizing equipment, a cooling station, a puller, a saw, or combinations thereof. Nonlimiting examples of suitable extruders may include twin screw, smooth bore, grooved-feed, or combinations thereof. The extrusion line 302 may extrude a length of polymeric pipe 301 and cut the length of polymeric pipe 301 when the length of the polymeric pipe 301 is a desired length. Suitable lengths of polymeric pipe 301 include 5 ft, 10 ft, 15 ft, 20 ft, 25 ft, 30 ft, 35 ft, 40 ft, 45 ft, 50 ft, or greater. The cut length of polymeric pipe 301 leaves the extrusion line 302 in the direction shown by arrow C. As seen in FIG. 3A, the conveyor chain 330 may receive the length of polymeric pipe 301 when the conveyor chain 330 is in the first position. The conveyor chain 330 may move away, or index, from the extrusion line 302 in the direction shown by arrow C. The distance of indexing may include, for example, 1 inch, 6 inches, 12 inches, 2 ft, 3 ft, 4 ft, 5 ft, or greater. The force for the indexing of the conveyor chain 330 may be provided by the rotating mechanism 337, which may rotate sprockets 336, for example. Two ratcheted rollers 335 are shown in FIG. 3A on end 340 of the conveyor chain 330, capable of unidirectional rotation, e.g., counterclockwise, clockwise, along a longitudinal axis thereof, or combinations thereof. The unidirectional rotation of the ratcheted rollers 335 allows the movement, e.g. indexing, of the conveyor chain 330 to move the extruded polymeric pipe 301 away from the extrusion line 302 in the direction shown by arrow C, without the pipe 301 slipping on the rollers 334 of the conveyor chain 330.

In the view shown in FIG. 3A, channel 322 of the pair of parallel channels may be seen coupled to the support frame 380. The U-shaped path for movement of the conveyor chain 330 provided by the channel 322 may also be seen. In embodiments, the pair of parallel channels may comprise an upper portion 324 and a lower portion 326 connected by an about 180° end or nose portion 333. The pipe-guide members 356 may prevent a movement of the length of polymeric pipe 301 off the conveyor chain 330. The horizontal movement mechanisms 358 of the coupling members 350 and 352 of the positioning platform 310 may move the positioning platform 310 horizontally about the support frame 380.

As discussed above, the vacuum lift mechanism 360 may comprise a suction source (e.g., a vacuum pump) and an engaging surface 362. The vacuum lift mechanism 360 may also have a mechanism 364 for raising and lowering the vacuum lift mechanism 360, and the mechanism 364 may be coupled to the positioning platform 310 and/or the support frame 380. As seen in FIG. 3A, the mechanism 364 may couple to the support frame 380 via a vacuum lift support 354. The vacuum lift support 354 may be of the same material as the support frame 380. The vacuum lift mechanism 360 may have a lower position and an upper position, and the mechanism 364 may raise and lower the vacuum lift mechanism 360 to load the length of polymeric pipe 301 in the bundling cart 303. The mechanism 364 for raising and lowering the vacuum lift mechanism 360 may comprise a scissor lift, a continuous screw assembly, a hydraulic assembly, an electro-mechanical assembly, a pneumatic assembly, a telescoping assembly, or combinations thereof. As can be seen in FIG. 3A, the vacuum lift mechanism 360 may have a retracted position so that engaging surface 362 is above the length of polymeric pipe 301 and not engaged with the length of polymeric pipe 301. The suction source (e.g., a vacuum pump) may be contained within the mechanism 364, external to the mechanism 364, within the vacuum lift mechanism 360, external to the vacuum lift mechanism 360, or combinations thereof. In an embodiment, a flow path for application of a vacuum is provided by an interior bore of vacuum lift support 354, support frame 380, and/or positioning platform 310.

Figure 3B:
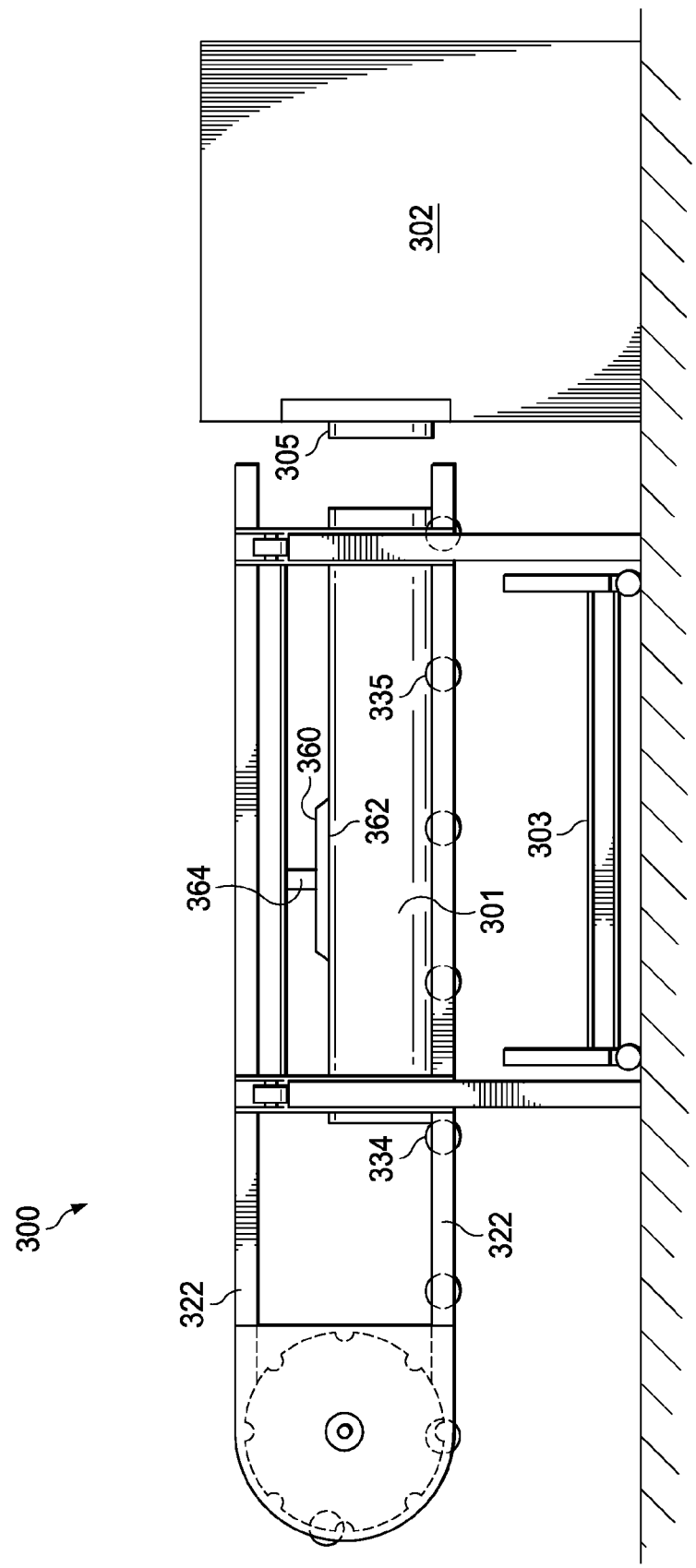

As shown in FIG. 3B, the mechanism 364 may extend and lower the vacuum lift mechanism 360 so that engaging surface 362 of the vacuum lift mechanism 360 may engage an outer surface of the length of polymeric pipe 301. The suction source of the vacuum lift mechanism 360 may create a vacuum force which maintains an engagement of the engaging surface 362 with the length of polymeric pipe 301 while the mechanism 364 extends and retracts, and while the length of polymeric pipe 301 is raised and lowered. The extrusion line 302 may extrude another pipe 305 while the polymeric pipe loader 300 loads the polymeric pipe 301 onto the bundling cart 303.

Figure 3C:
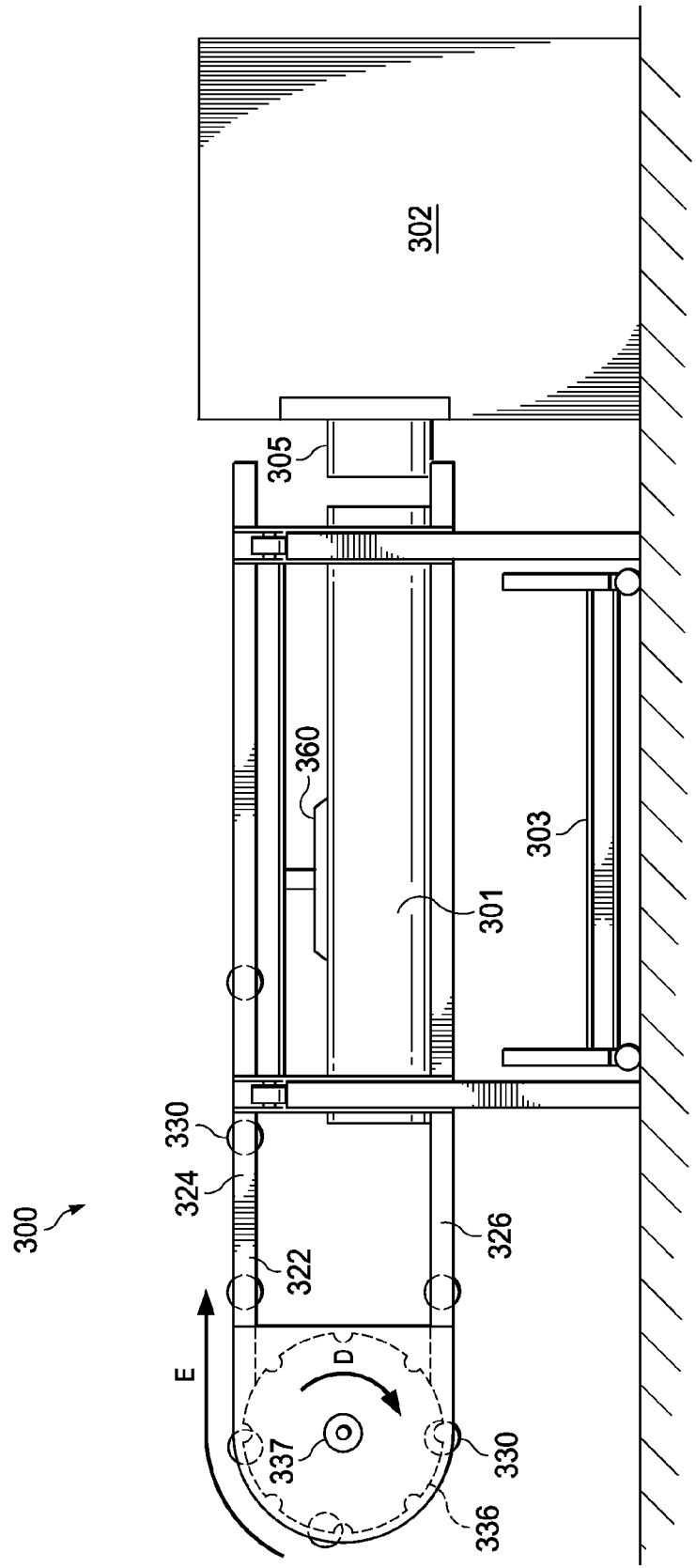

As shown in FIG. 3C, the conveyor chain 330 may move from the first position (shown in FIG. 3A) to the second position along the path provided by the pair of parallel channels, of which channel 322 can be seen in FIG. 3C. Before the conveyor chain 330 moves to the second position, the vacuum lift mechanism 360 may engage the length of polymeric pipe 301 and exert an upward force on the polymeric pipe 301 such that the conveyor chain 330 may move under the polymeric pipe 301 without damaging or otherwise compromising an integrity or quality of the polymeric pipe. In an embodiment, the vacuum lift mechanism 360 may lift the polymeric pipe 301 by a small distance, such as 1 mm, 1 cm, 1 inch, etc. In an alternative embodiment, the vacuum lift mechanism 360 may provide an upward force such than the conveyor chain 330 slides from beneath polymeric pipe 301, e.g., utilizing the rollers 334 to minimize any damaging contact of the conveyor chain 330 with the polymeric pipe 301. The conveyor chain 330 may then move from the first position to the second position, as described below. To move the conveyor chain 330 to the second position, the rotating mechanism 337 may rotate the sprocket 336 in the direction shown by arrow D (e.g., a clock-wise direction). The rotation of the sprocket 336 consequently may move the conveyor chain 330 along the path provided by the pair of parallel channels (channel 322 of the pair can be seen in FIGS. 3A-3D) in the direction shown by arrow E (e.g., a clock-wise direction). When the conveyor chain 330 is in the second position, a space between the pair of parallel channels may open below the length of polymeric pipe 301, as described in more detail below.

The pair of parallel channels may have an upper portion 324 and a lower portion 326 connected by an about 180° end portion 333 that form a U-shaped path, e.g., as shown with channel 322. When moving from the first position to the second position, the conveyor chain 330 may move to the upper portion 324 of the channel 322. In such a scenario, the lower portion 326 of the pair of parallel channels may have a space through which the vacuum lift mechanism 360 may lower the polymeric pipe 301 to the bundling cart 303 without encountering obstruction by the conveyor chain 330. When moving from the second position to the first position, the conveyor chain 330 may move to the lower portion 326 of the channel 322 (e.g., in a counter-clockwise direction). FIG. 3C shows the extrusion line 302 may continue to extrude the next polymeric pipe 305 while the polymeric pipe loader 300 operates.

Figure 3D:
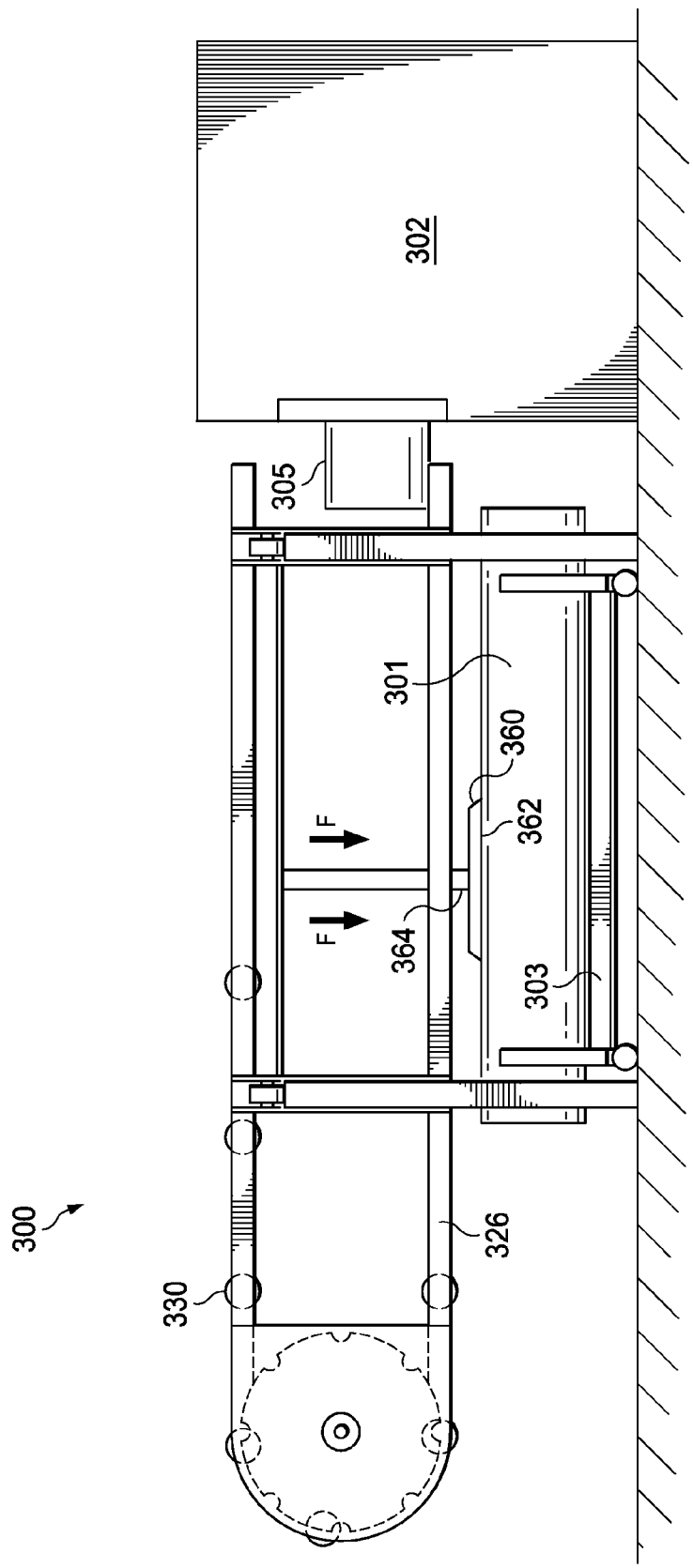

As shown in FIG. 3D, the vacuum lift mechanism 360 may lower the length of polymeric pipe 301 to the bundling cart 303. The mechanism 364 may extend in the direction shown by arrows F (e.g., downward) and lower the vacuum lift mechanism 360 to a lower position. As discussed above, the lower portion 326 of the pair of parallel channels may have a space through which the vacuum lift mechanism 360 may lower the polymeric pipe 301 to the bundling cart 303. When lowering the pipe 301, the vacuum lift mechanism 360 may pass through the space between the lower portion 326 of the pair of parallel channels created after the conveyor chain 330 moves to the second position. In the lower position, the vacuum lift mechanism 360 may release the length of polymeric pipe 301 in the bundling cart 303, and the engaging surface 362 may disengage from the length of polymeric pipe 301. After release, the mechanism 364 may retract and raise the vacuum lift mechanism 360 to the upper position. After the vacuum lift mechanism 360 returns to the upper position, the conveyor chain 330 may return to the first position (e.g., via counter-clockwise rotation of sprocket 336) to receive the next length of polymeric pipe 305. FIG. 3D shows the extrusion line 302 may continue to extrude the next length of polymeric pipe 305 while the polymeric pipe loader 300 operates.

As can be seen in FIGS. 3A-3D, a length of polymeric pipe 301 may be transferred from the extrusion line 302 to the bundling cart 303. The transfer may be made without need for human assistance, e.g., in automated embodiments. Alternatively, the transfer may be made with limited human assistance for manually controlled movements of the polymeric pipe loader 300. Regardless, risk of injury to humans is prevented because human physical interaction with the heavy lengths of polymeric pipe is not necessary to transfer the heavy lengths of polymeric pipe to the bundling cart 303. The polymeric pipe loader 300 is shown in FIGS. 3A-3D as next to the extrusion line 302 when loading polymeric pipe 301 to bundling cart 303; however, it should be understood the polymeric pipe loader 300 may move to bundling carts which are not located next to the extrusion line 302 to load a length of polymeric pipe.

Referring to FIG. 4, a side view of a polymeric pipe loading system 400 utilizing an alternative embodiment of the disclosed method. In the embodiment of FIG. 4, the conveyor chain 430 is in the second position. In the second position, the conveyor chain 430 may receive a length of polymeric pipe 401 from the extrusion line 402 on top of the polymeric pipe loader 400. The rollers 434 are configured to receive the length of polymeric pipe 401 on the bottom 432 of the conveyor chain 430 when the conveyor chain 430 is in the second position. In the embodiment of the polymeric pipe loader 400 shown in FIG. 4, at least one ratcheted roller 435 may be placed on end 440 of the conveyor chain 430, and at least one ratcheted roller 439 may be placed on opposite end 442 of the conveyor chain 430. The conveyor chain 430 may move away, or index, from the extrusion line 402 in the direction shown by arrow G (e.g., counter-clockwise rotation of sprocket 436). The force for the indexing of the conveyor chain 430 may be provided by the rotating mechanism 437, which may rotate (e.g., counterclockwise) sprockets 436, for example. The ratcheted roller 439 may prevent the pipe 401 from sliding on the conveyor chain 430 during indexing. The ratcheted roller 439 may be configured to not rotate in a given direction (e.g., clockwise) to prevent the polymeric pipe 401 from sliding toward the extrusion line 402 and interfering with the next extruded pipe.

As shown in FIG. 4, the bundling cart 403 may be positioned to a side of the polymeric pipe loader 400. The length of polymeric pipe 401 may be loaded onto bundling cart 403, for example, by lifting the pipe 401 from the polymeric pipe loader 400 with an overhead bridge crane (not shown) and lowering the pipe 401 into the bundling cart 403. In this manner, polymeric pipe loader 400 may continue to be used should there be certain problems such as malfunction of vacuum lift mechanism 460. The height of the polymeric pipe loader 400 may be adjusted to match the height of the extruded pipe via, for example, the vertical height mechanism 486.

In embodiments, the polymeric pipe loader may have multiple sections, for example, 2, 3, 4, 5, or greater sections. In embodiments, each section of the polymeric pipe loader may load a portion (e.g., 10 ft) of a length of polymeric pipe (e.g., 20 ft, 30 ft, 40 ft, 50 ft, or greater). Without intending to be bound by theory, it has been found that a polymeric pipe loader having sections configured to receive approximately 10 ft of a length of polymeric pipe per section may avoid damage to the polymeric pipe and to personnel in a pipe loading area while loading the pipe to a bundling cart. When using polymeric pipe loaders having sections configured to receive approximately 10 ft of a length of a polymeric pipe, the polymeric pipe does not exhibit destructive or dangerous bending or swaying.

A polymeric pipe loader comprising one section may load polymeric pipe comprising about 10 ft, a polymeric pipe loader comprising two sections may load polymeric pipe comprising about 20 ft, a polymeric pipe loader comprising three sections may load polymeric pipe comprising about 30 ft, a polymeric pipe loader comprising four sections may load polymeric pipe comprising about 40 ft, and a polymeric pipe loader comprising five sections may load polymeric pipe comprising about 50 ft, for example.

Each section of a polymeric pipe loader may have a vacuum lift mechanism. Thus, a polymeric pipe loader comprising one section may have one vacuum lift mechanism, a polymeric pipe loader comprising two sections may have two vacuum lift mechanisms, a polymeric pipe loader comprising three sections may have three vacuum lift mechanisms, a polymeric pipe loader comprising four sections may have four vacuum lift mechanisms, and a polymeric pipe loader comprising five sections may have five vacuum lift mechanisms.

Figure 5:
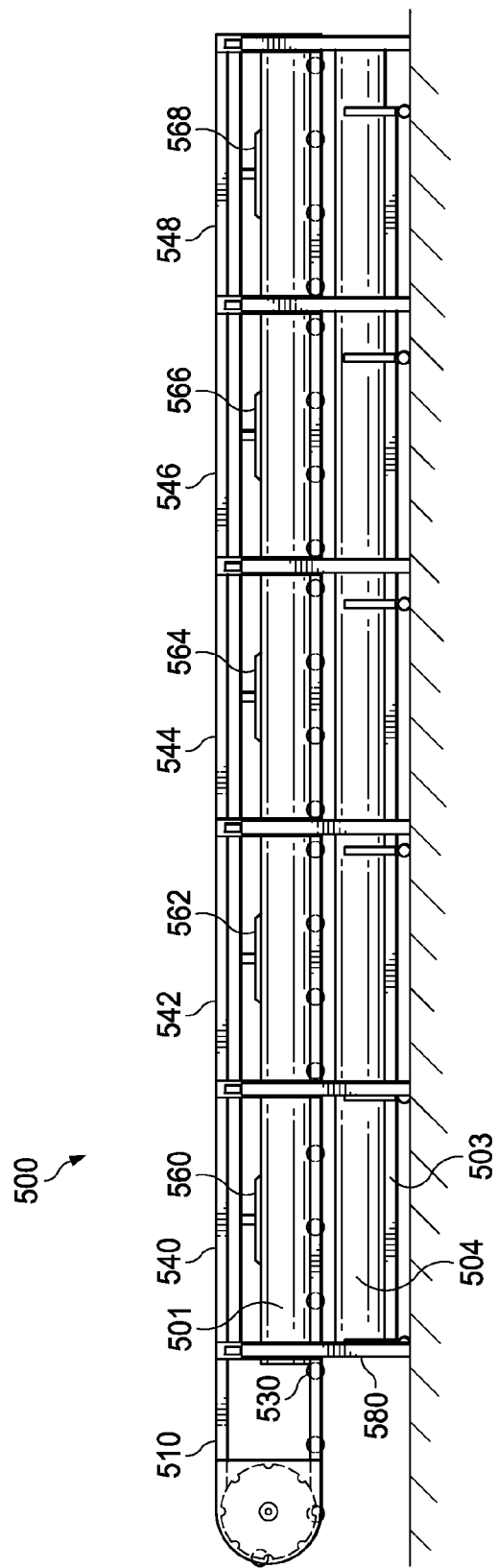
FIG. 5 shows a side view of an embodiment of a polymeric pipe loader having five sections.

FIG. 5 shows a polymeric pipe loader 500 having five sections 540, 542, 544, 546, and 548. Each of the sections 540, 542, 544, 546, and 548 may have a length of about 10 ft, and the sections 540, 542, 544, 546, and 548 may be connected in series to receive the length of polymeric pipe 501 on the conveyor chain 530. The length of polymeric pipe 501 may have a length of about 50 ft. The section 540 of the polymeric pipe loader 500 may have a vacuum lift mechanism 560, the section 542 of the polymeric pipe loader 500 may have a vacuum lift mechanism 562, the section 544 of the polymeric pipe loader 500 may have a vacuum lift mechanism 564, the section 546 of the polymeric pipe loader 500 may have a vacuum lift mechanism 566, and the section 548 of the polymeric pipe loader 500 may have a vacuum lift mechanism 568. The vacuum lift mechanisms 560, 562, 564, 566, and 568 may be configured as described in the embodiments above. In embodiments of the disclosed polymeric pipe loader having multiple sections, such as the polymeric pipe loader 500 of FIG. 5, the vacuum lift mechanisms 560, 562, 564, 566, and 568 may operate synchronously, and the vacuum lift mechanisms 560, 562, 564, 566, and 568 may be lowered and raised together, accomplishing one or more of the following: engaging the polymeric pipe 501, lowering the polymeric pipe 501 to the bundling cart 503, releasing the polymeric pipe 501 (e.g., next to loaded polymeric pipe 504), and raising to the upper position.

In the embodiments disclosed above, the polymeric pipe loader may be mobile, e.g., movable from one or more extrusion line(s) to a location of a bundling cart. The location of the bundling cart need not depend on the location of the extrusion line. The controller as described herein may control the movement of the polymeric pipe loader through the embodiments described above. For example, the polymeric pipe loader may move in any direction on a loading floor to load a length of polymeric pipe (which has been received on a conveyor chain) onto a bundling cart.

Embodiments disclosed herein vertically align the polymeric pipe receiving area (e.g., the conveyor chain) with the loading mechanism (e.g., the vacuum lift mechanism), thus reducing the operating footprint for loading polymeric pipe from an extrusion line to a bundling cart.

Embodiments of the disclosed polymeric pipe loader shown in FIGS. 3A-3D and FIG. 4 illustrate the dual capability for receiving a length of polymeric pipe. The disclosed polymeric pipe loader may 1) receive a length of polymeric pipe on a conveyor chain in the first position, and/or 2) receive a polymeric pipe on a conveyor chain in the second position.

In embodiments where the length of polymeric pipe is received on a conveyor chain in the first position, the pipe loading method may include, in any appropriate combination or order, extruding the length of polymeric pipe, cutting the length of polymeric pipe, receiving the length of polymeric pipe on the conveyor chain, engaging the length of polymeric pipe with a vacuum lift mechanism, and transferring the length of polymeric pipe to a bundling cart. Transferring the length of pipe received on the conveyor chain in the first position may be made to a bundling cart by moving the conveyor chain along a pair of parallel channels from a first position to a second position (the conveyor chain being under the length of polymeric pipe when in the first position), lowering an engaged length of polymeric pipe to the bundling cart after the conveyor chain is moved, releasing the length of polymeric pipe from the vacuum lift mechanism, raising the vacuum lift mechanism to an upper position, and indexing the conveyor chain while the length of polymeric pipe is received thereon. During the step of indexing, the conveyor chain may move away, or index, from an extrusion line so that the cut length of polymeric pipe moves away from the extrusion line and any length of pipe continuing to be extruded. The distance of indexing may include, for example, 1 inch, 6 inches, 12 inches, 2 ft, 3 ft, 4 ft, 5 ft, or greater. The step of receiving the length of polymeric pipe on the conveyor chain may include rotating at least one ratcheted roller of the conveyor chain only in one direction. Additionally, the positioning platform of the polymeric platform may be moved vertically, horizontally, or both.

In embodiments where the length of polymeric pipe is received on the conveyor chain in the second position, the pipe loading method may include, in any appropriate combination or order, extruding a length of polymeric pipe, cutting the length of polymeric pipe, moving the conveyor chain along a pair of parallel channels to a second position above a vacuum lift mechanism, receiving the length of polymeric pipe onto the conveyor chain located in the second position, transferring the length of polymeric pipe from the conveyor chain to a bundling cart, and moving the positioning platform vertically, horizontally, or both. Transfer of the length of pipe received on the conveyor chain in the second position may be made to a bundling cart by moving the positioning platform to the bundling cart and loading the polymeric pipe on the bundling cart by methods as will be understood to those skilled in the art with the aid this disclosure. When the polymeric pipe is received on the conveyor chain, at least one ratcheted roller may rotate only in one direction.

ADDITIONAL DESCRIPTION OF THE EMBODIMENTS

Embodiment 1. In an embodiment, a polymeric pipe loader comprises a support frame, a positioning platform coupled to the support frame, and a vacuum lift mechanism coupled to the support frame, the positioning platform, or both; wherein the positioning platform comprises a pair of parallel channels coupled to the support frame, a conveyor chain configured to move from a first position to a second position along the pair of parallel channels, a sprocket configured to move the conveyor chain along the pair of channels, and a rotating mechanism configured to rotate the sprocket.

Embodiment 2. The polymeric pipe loader of embodiment 1, wherein the conveyor chain comprises a plurality of rollers configured to receive a length of polymeric pipe thereon.

Embodiment 3. The polymeric pipe loader of embodiment 2, wherein the plurality of rollers comprises at least one ratcheted roller adjacent an end of the conveyor chain, wherein the at least one ratcheted roller is configured to rotate in only one direction.

Embodiment 4. The polymeric pipe loader of embodiments 2 to 3, wherein the plurality of rollers are configured to receive the length of polymeric pipe on a top of the conveyor chain when the conveyor chain is in the first position, wherein the plurality of rollers are configured to receive the length of polymeric pipe on a bottom of the conveyor chain when the conveyor chain is in the second position.

Embodiment 5. The polymeric pipe loader of embodiments 1 to 4, wherein the support frame is configured to adjust a vertical height of the positioning platform.

Embodiment 6. The polymeric pipe loader of embodiments 1 to 5, wherein the positioning platform is configured to move horizontally about the support frame.

Embodiment 7. The polymeric pipe loader of embodiments 1 to 6, the positioning platform further comprising a coupling member configured to couple the pair of parallel channels to the support frame, wherein the coupling member is further configured to move the positioning platform horizontally about the support frame.

Embodiment 8. The polymeric pipe loader of embodiments 1 to 7, further comprising a controller to control a movement of the support frame, the positioning platform, the vacuum lift mechanism, or combinations thereof.

Embodiment 9. The polymeric pipe loader of embodiments 1 to 8, the positioning platform further comprising a pipe-guide member coupled to at least one of the pair of parallel channels.

Embodiment 10. The polymeric pipe loader of embodiments 1 to 9, wherein the pair of channels form a U-shaped path for the conveyor chain.

Embodiment 11. A polymeric pipe loading method, which may optionally utilize the polymeric pipe loader of embodiments 1 to 10, comprising extruding a length of polymeric pipe, cutting the length of polymeric pipe, receiving the length of polymeric pipe on a conveyor chain of a positioning platform, engaging the length of polymeric pipe with a vacuum lift mechanism, and transferring the length of polymeric pipe to a bundling cart.

Embodiment 12. The method of embodiment 11, wherein transferring the length of polymeric pipe comprises moving the conveyor chain along a pair of parallel channels from a first position to a second position, lowering the engaged length of polymeric pipe to a bundling cart after the conveyor chain is moved, and releasing the length of polymeric pipe from the vacuum lift mechanism, wherein the conveyor chain is under the length of polymeric pipe when in the first position.

Embodiment 13. The method of embodiments 11 to 12, further comprising indexing the conveyor chain while the length of polymeric pipe is received thereon.

Embodiment 14. The method of embodiments 11 to 13, wherein receiving the length of polymeric pipe comprises rotating at least one ratcheted roller of the conveyor chain only in one direction.

Embodiment 15. The method of embodiments 11 to 14, further comprising moving the positioning platform vertically, horizontally, or both.

Embodiment 16. A polymeric pipe loading method, which may have steps which can be additionally or alternatively performed with any combination of the steps of embodiments 11 to 15 and which may optionally utilize the polymeric pipe loader of embodiments 1 to 10, comprising extruding a length of polymeric pipe, cutting the length of polymeric pipe, moving a conveyor chain along a pair of parallel channels of a positioning platform to a second position above a vacuum lift mechanism, and receiving the length of polymeric pipe on the conveyor chain in the second position.

Embodiment 17. The method of embodiment 16, further comprising transferring the length of polymeric pipe to a bundling cart.

Embodiment 18. The method of embodiment 17, wherein transferring the length of polymeric pipe comprises moving the positioning platform to the bundling cart.

Embodiment 19. The method of embodiments 16 to 18, wherein receiving the length of polymeric pipe comprises rotating at least one ratcheted roller of the conveyor chain only in one direction.

Embodiment 20. The method of embodiments 16 to 19, further comprising moving the positioning platform vertically, horizontally, or both.

The ordering of steps in the various methods are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments. In an embodiment, the conveyor chain may receive pipe in "real time" as it exits the extrusion line such that no separate storage or handling equipment is needed.

Also, techniques, systems, subsystems and methods described and illustrated in the various embodiments as discrete or separate may be combined or integrated with other systems, modules, techniques, or methods without departing from the scope of the present disclosure. Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Other examples of changes, substitutions, and alterations are ascertainable by one skilled in the art and could be made without departing from the spirit and scope disclosed.

The discussion of a reference in the disclosure is not an admission that it is prior art to the inventive subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the disclosed subject matter. Thus, the claims are a further description and are an addition to the preferred embodiments of the inventive subject matter.

What is claimed is:

1. A polymeric pipe loader comprising:
a support frame;
a positioning platform coupled to the support frame, wherein the positioning platform comprises:
   a pair of parallel channels coupled to the support frame;
   a conveyor chain configured to move from a first position to a second position along the pair of parallel channels, wherein the conveyor chain comprises a plurality of rollers configured to receive a length of polymeric pipe thereon, wherein the plurality of rollers have a longitudinal axis which is perpendicular to a longitudinal axis of the length of polymeric pipe, wherein the plurality of rollers comprises at least one ratcheted roller, wherein the conveyor chain longitudinally indexes the length of polymeric pipe from an extruder while the length of polymeric pipe is received thereon without the length of polymeric pipe slipping on the plurality of rollers via a unidirectional rotation of the at least one ratcheted roller;
   a sprocket configured to move the conveyor chain along the pair of channels;
   a rotating mechanism configured to rotate the sprocket; and
   a vacuum lift mechanism coupled to the support frame, the positioning platform, or both.

2. The polymeric pipe loader of claim 1, wherein the at least one ratcheted roller is adjacent an end of the conveyor chain.

3. The polymeric pipe loader of claim 1, wherein the plurality of rollers are configured to receive the length of polymeric pipe on a top of the conveyor chain when the conveyor chain is in the first position, wherein the plurality of rollers are configured to receive the length of polymeric pipe on a bottom of the conveyor chain when the conveyor chain is in the second position.

4. The polymeric pipe loader of claim 1, wherein the support frame is configured to adjust a vertical height of the positioning platform.

5. The polymeric pipe loader of claim 1, wherein the positioning platform is configured to move horizontally about the support frame.

6. The polymeric pipe loader of claim 1, the positioning platform further comprising:
a coupling member configured to couple the pair of parallel channels to the support frame, wherein the coupling member is further configured to move the positioning platform horizontally about the support frame.

7. The polymeric pipe. loader of claim 1, further comprising:
a controller to control a movement of the support frame, the positioning platform, the vacuum lift mechanism, or combinations thereof.

8. The polymeric pipe loader of claim 1, the positioning platform further comprising:
a pipe-guide member coupled to at least one of the pair of parallel channels.

9. The polymeric pipe loader of claim 1, wherein the pair of channels form U-shaped path for the conveyor chain.

10. A polymeric pipe loading method comprising:
receiving a length of polymeric pipe from an extruder on a conveyor chain of a positioning platform, wherein the conveyor chain comprises a plurality of rollers, wherein the plurality of rollers have a longitudinal axis which is perpendicular to a longitudinal axis of the length of polymeric pipe, wherein the plurality of rollers comprises at least one ratcheted roller;
longitudinally indexing the length of polymeric pipe from the extruder while the length of polymeric pipe is received on the conveyor chain and without slipping the length of polymeric pipe on the plurality of rollers of the conveyor chain via a unidirectional rotation of the at least one ratcheted roller;
engaging the length of polymeric pipe with a vacuum lift mechanism; and
transferring the length of polymeric pipe to a bundling cart.

11. The method of claim 10, wherein transferring the length of polymeric pipe comprises:
moving the conveyor chain along a pair of parallel channels from a first position to a second position, wherein the conveyor chain is under the length of polymeric pipe when in the first position;
lowering the engaged length of polymeric pipe to a bundling cart after the conveyor chain is moved; and
releasing the length of polymeric pipe from the vacuum lift mechanism.

12. The method of claim 10, wherein receiving the length of polymeric pipe comprises:
rotating at least one ratcheted roller of the conveyor chain only in one direction.

13. The method of claim 10, further comprising:
moving the positioning platform vertically, horizontally, or both.

14. The method of claim 10, further comprising:
extruding the length of polymeric pipe; and
cutting the length of polymeric pipe.

15. A polymeric pipe loading method comprising:
moving a conveyor chain along a pair of parallel channels of a positioning platform from a first position to a second position above a vacuum lift mechanism;
receiving a length of polymeric pipe from an extruder on the conveyor chain in the second position, wherein the conveyor chain comprises a plurality of rollers, wherein the plurality of rollers have a longitudinal axis which is perpendicular to a longitudinal axis of the length of polymeric pipe, wherein the plurality of rollers comprises at least one ratcheted roller; and
longitudinally indexing the length of polymeric pipe from the extruder while the length of polymeric pipe is received on the plurality of rollers of the conveyor chain in the second position and without slipping the length of polymeric pipe on the plurality of rollers via a unidirectional rotation of the at least one ratcheted roller.

16. The method of claim 15, further comprising:
transferring the length of polymeric pipe to a bundling cart.

17. The method of claim 16, wherein transferring the length of polymeric pipe comprises:
moving the positioning platform to the bundling cart.

18. The method of claim 15, wherein receiving the length of polymeric pipe comprises:
rotating at least one ratcheted roller of the conveyor chain only in one direction.

19. The method of claim 15, further comprising:
moving the positioning platform vertically, horizontally, or both.

20. The method of claim 15, further comprising:
extruding the length of polymeric pipe; and
cutting the length of polymeric pipe.

* * * * *